United States Patent
Aronovich et al.

(10) Patent No.: US 10,042,854 B2
(45) Date of Patent: Aug. 7, 2018

(54) DETECTION OF DATA AFFECTED BY INACCESSIBLE STORAGE BLOCKS IN A DEDUPLICATION SYSTEM

(71) Applicant: INTERNATIONAL BUSINESS MACHINES CORPORATION, Armonk, NY (US)

(72) Inventors: Lior Aronovich, Thornhill, CA (US); Amir Kredi, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 14/743,587

(22) Filed: Jun. 18, 2015

(65) Prior Publication Data
US 2016/0371294 A1 Dec. 22, 2016

(51) Int. Cl.
G06F 17/30 (2006.01)

(52) U.S. Cl.
CPC .. *G06F 17/30156* (2013.01); *G06F 17/30424* (2013.01)

(58) Field of Classification Search
CPC ............... G06F 17/30156; G06F 17/30424
USPC .............................. 707/692, 756, 693
See application file for complete search history.

(56) References Cited

U.S. PATENT DOCUMENTS

| | | | |
|---|---|---|---|
| 8,392,384 B1 * | 3/2013 | Wu | G06F 17/30156 707/693 |
| 8,397,080 B2 | 3/2013 | Lu et al. | |
| 8,782,011 B2 | 7/2014 | Guo | |
| 8,825,720 B1 * | 9/2014 | Xie | G06F 17/30156 707/694 |
| 9,367,557 B1 | 6/2016 | Lin et al. | |
| 9,411,815 B1 | 8/2016 | Lu et al. | |
| 9,514,146 B1 | 12/2016 | Wallace et al. | |
| 2012/0185447 A1 | 7/2012 | Zhang et al. | |
| 2014/0201833 A1 | 7/2014 | Wang | |
| 2014/0201838 A1 | 7/2014 | Varsanyi et al. | |
| 2014/0304357 A1 | 10/2014 | Bestler et al. | |
| 2015/0154243 A1 | 6/2015 | Danaher | |
| 2016/0154834 A1 | 6/2016 | Friedman | |

OTHER PUBLICATIONS

Macko et al., "Tracking Back References in a Write-Anywhere File System" 14 pages, Proceedings of the 8th USENIX conference on File and storage technologies, ACM Digital Library, Berkeley, CA, US.

List of IBM Patents or Patent Applications Treated as Related dated Jun. 16, 2017 (2 pages).

* cited by examiner

*Primary Examiner* — Monica Pyo
(74) *Attorney, Agent, or Firm* — Griffiths & Seaton PLLC

(57) ABSTRACT

Various embodiments for managing data in a data storage having data deduplication. In response to a portion of the data storage determined to be inaccessible, an identifier of a user data segment is queried by examining a corresponding back reference data structure, the back reference data structure implemented as an approximation of a relationship between the user data segment and a particular storage block in the data storage. If the outcome of the query is negative, the user data segment is determined not associated with the particular storage block. If the outcome of the query is positive, the user data segment is warranted be examined further to determine if the user data segment is associated with the particular storage block.

19 Claims, 7 Drawing Sheets

400

BACK REFERENCE
DATA STRUCTURE       FORM TYPE BITS           STORAGE BITS
   FORM TYPES        2 b                      126 b
 AND MIGRATION:

2 b   2 b                124 b
FORM TYPE 00 [START FORM]:  | 00 | # IDS | UP TO 3 IDS OF 4 B EACH |
     4 IDS 2 b   3 b                123 b
FORM TYPE 01:        | 01 | # IDS | UP TO 7 IDS OF 2 B EACH |
     8 IDS 2 b   4 b                122 b
FORM TYPE 10:        | 10 | # IDS | UP TO 15 IDS OF 1 B EACH |
     16 IDS 2 b                      126 b
FORM TYPE 11:        | 11 | HASH TABLE - EACH BIT IS A BUCKET IN THE IDS SPACE | b = BIT
B = BYTE

DETECTION OF DATA AFFECTED BY INACCESSIBLE STORAGE BLOCKS IN A DEDUPLICATION SYSTEM

BACKGROUND OF THE INVENTION

Field of the Invention

The present invention relates in general to computing systems, and more particularly to, various embodiments for detecting data affected by inaccessible storage blocks in computing storage environments incorporating deduplication functionality.

Description of the Related Art

Today with modern technology, large volumes of data are storable on disk drives; these drives can exist as a solo entity, or as part of a broader make up within a larger storage environment. Often times when writing to even the smallest environment, single drives, duplicate data is written. These duplicated contents can then be deduplicated using standard deduplication techniques so long as specific metrics are met.

Various deduplication techniques may be used to deduplicate files. For example, the file may be analyzed against an additional file to determine if the file has the same size, name, and contents when analyzed at the block-by-block level. Deduplication technology allows, at a high level, the elimination of duplicate information in storage environments, such that the storage held by the duplicate information is then released, opening up potentially significant amounts of additional storage space in the computing storage environment and otherwise improving performance.

SUMMARY OF THE INVENTION

In one embodiment, by way of example only, a method for managing data in a data storage having data deduplication, by a processor device, is provided. In response to a portion of the data storage determined to be inaccessible, an identifier of a user data segment is queried by examining a back reference data structure corresponding to a particular inaccessible storage block in the data storage, and an approximate result is calculated on whether the user data segment is associated with the particular storage block. If the outcome of the query is negative, the user data segment is determined not associated with the particular storage block. If the outcome of the query is positive, the user data segment is warranted be examined further to determine if the user data segment is associated with the particular storage block.

In a further embodiment, again by way of example only, a system for managing data in a data storage having data deduplication is provided. A processor, in response to a portion of the data storage determined to be inaccessible, queries an identifier of a user data segment by examining a corresponding back reference data structure corresponding to a particular inaccessible storage block in the data storage, and an approximate result is calculated on whether the user data segment is associated with the particular storage block. If the outcome of the query is negative, the user data segment is determined not associated with the particular storage block. If the outcome of the query is positive, the user data segment is warranted be examined further to determine if the user data segment is associated with the particular storage block.

In a still further embodiment, a computer program product for managing data in a data storage having data deduplication is provided. The computer program product comprises a non-transitory computer-readable storage medium having computer-readable program code portions stored therein. The computer-readable program code portions comprise a first executable portion, that, in response to a portion of the data storage determined to be inaccessible, queries an identifier of a user data segment by examining a corresponding back reference data structure corresponding to an inaccessible storage block in the data storage, and an approximate result is calculated on whether the user data segment is associated with the particular storage block. If the outcome of the query is negative, the user data segment is determined not associated with the particular storage block. If the outcome of the query is positive, the user data segment is warranted be examined further to determine if the user data segment is associated with the particular storage block.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
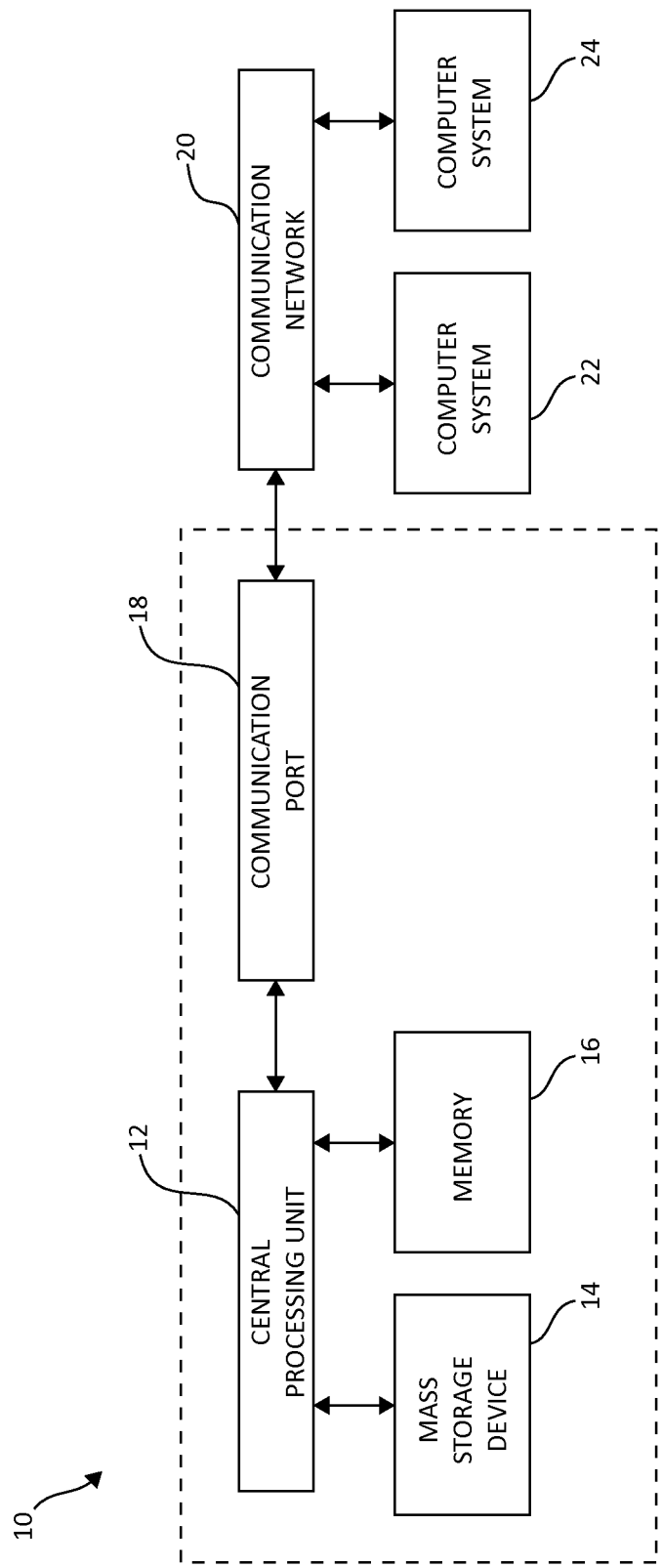
FIG. 1 is a block diagram illustrating a computing system environment having an example storage device in which aspects of the present invention may be realized.

As mentioned above, large amounts of data have to be processed daily and the current trend suggests that these amounts will continue being ever-increasing in the foreseeable future. Deduplication is a storage saving technique that is highly successful in enterprise storage. Data deduplication systems are increasingly utilized because they help reduce the total amount of physical storage that is required to store data. This reduction is accomplished by ensuring that duplicate data is not stored multiple times. By removing duplicates within and across files. The idea underlying a deduplication system is to exploit the fact that large parts of the available data is copied again and again and forwarded without any change, by locating repeated data and storing only its first occurrence. Data entrusted to a deduplicating system often times is required to be exported and/or backed up to a different site. Deduplication reduces bandwidth and storage capacities. For example, for workloads with inherent repetitions, deduplication is reported to reduce capacity with ratios ranging between 1:2 and 1:50 in backup environments, and up to 1:10 in virtual machine environments.

Deduplication may be achieved by splitting the incoming data into deduplication chunks (e.g., using chunking strategies) and computing a fingerprint (e.g., a cryptographic fingerprint) on each chunk. Repeating chunks are then identified by lookups into a fingerprint database (DB) that stores the fingerprints of chunks in the system. In other words, following the splitting of the incoming data, each chunk is classified as redundant or unique by checking if the fingerprint has already been stored. Only data of unique chunks is stored because the deduplication operation only stores the unique data, while dropping data, which has been previously stored.

In data deduplication storage systems, deduplicated data is commonly stored in storage blocks, of fixed or variable size. Data in storage blocks can be referenced by multiple user data objects. Data deduplication storage systems are sensitive to cases where storage blocks become damaged or inaccessible, because a single storage block can be referenced by many user data objects. Therefore losing a few storage blocks or even one storage block can potentially affect many user data objects. For this reason, it is important to provide a mechanism to enable efficient detection of the user data objects that are affected by damaged or inaccessible storage blocks. This mechanism will then enable the application of corrective measures for these user data objects.

In data deduplication storage systems, to enable reclamation of storage blocks that become unused due to deletion of all the user data objects that referenced such blocks, reference counters are typically used. Namely, each storage block is associated with a reference counter, that is incremented for each added data object that references that storage block, and decremented for each deleted data object that references that storage block. The reference counters method is efficient in storage and in processing. It's required storage is compact, and by packing reference counters together, efficient IO operations can be applied for retrieval and modification of reference counters.

However, with reference counters, in cases where storage blocks that contain referenced data become damaged or otherwise inaccessible, the only method for determining the user data objects that are affected, for recovery purposes, is to scan all the metadata of the user data objects to determine the objects that reference the problematic storage blocks. This is typically a costly process, and can require much resources and time for large systems. For example, if the metadata that specifies the references from user data objects to storage blocks constitutes 1% of the user data size, then for 128 TB of user data 1.28 TB of metadata should be read and processed. For larger repositories, the resource consumption of such a process is typically prohibitive.

Accordingly, a need exists for mechanisms to improve the efficiency and minimize the resource consumption of the process of identifying these affected user data objects, such as in cases of failed storage blocks.

To address this need for improvement, the mechanisms of the present invention include methodologies for efficient and lower resource-intensive identification of these affected user data objects. In one embodiment, for example, and as will be further described, the applicable user data is partitioned into segments that are sufficiently large, (e.g., 1 GB), and each such user data segment is associated with mapping metadata that specifies the physical data intervals contained in storage blocks that are referenced by the user data segment, their location in the storage blocks, their size, and their sequence of appearance in the user data segment. Each user data segment is associated with a unique identifier—a data segment identification (ID).

In an additional embodiment, each storage block, in addition to its associated reference counter, is also associated with a compact back reference data structure that enables to efficiently determine if a specific user data segment, based on its ID, references the specific storage block. Given such a back reference data structure and a given user data segment ID, if the outcome of the check is negative, then the queried user data segment does not reference that storage block. If the outcome of the check is positive, then the queried user data segment may or may not reference that storage block, and the internal metadata of the user data segment should be further inspected.

Therefore, the outcomes provided by the back reference data structure are approximations, and enable to efficiently prune the search space for identifying referencing user data segments, and considerably reduce the resource consumption of the search process. Updating the back reference data structure is an efficient operation, as will be further specified herein.

The back reference data structure is configured in a small size; therefore many back reference data structures may be able to fit in a particular memory location. The back reference data structure is associated with a particular storage block, and may be stored inside a storage block metadata, or outside in another memory location, yet still be associated with the storage block.

Turning now to FIG. 1, exemplary architecture 10 of a computing system environment, in which various aspects of the present invention may be implemented, is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID).

The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

CPU 12, or like processors and other hardware may perform various aspects of the present invention as will be detailed herein, including managing data in a data storage having data deduplication. In one embodiment, the CPU 12, in response to a portion of the data storage determined to be inaccessible, queries an identifier of a user data segment by examining a corresponding back reference data structure, the back reference data structure implemented as an approximation of a relationship between the user data segment and a particular storage block in the data storage. If the outcome of the query is negative, the user data segment is determined not associated with the particular storage block. If the outcome of the query is positive, the user data segment is warranted be examined further to determine if the user data segment is associated with the particular storage block.

In another embodiment, CPU 12 associates the storage block in the file system with the back reference data structure.

In still another embodiment, CPU 12 inspects metadata to determine if the particular storage block is referenced by the user data segment.

In still another embodiment, CPU 12 configures a size of the back reference data structure to be accommodated in memory.

In still another embodiment, CPU 12, pursuant to querying the identifier of a user data segment, loads the back reference data structure into the memory.

In a further embodiment, CPU 12 inspects metadata of the back reference data structure, inspects the identifier of the user data segment in a data repository, and inspects metadata of user data segments whose identifiers returned a positive query outcome for at least one of the back reference data structures of failed storage blocks.

Figure 2:
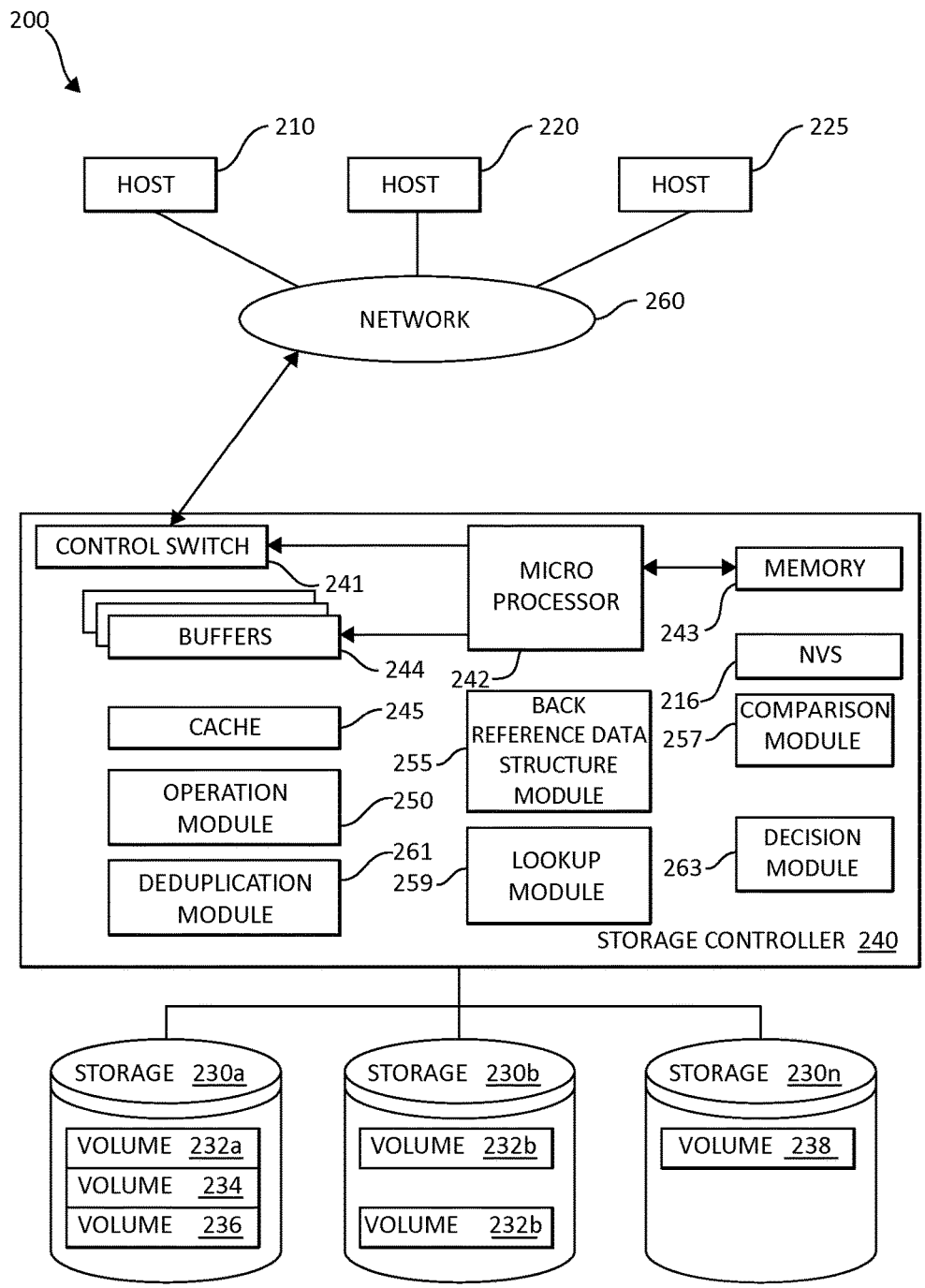
FIG. 2 is a block diagram illustrating a hardware structure of data storage system in a computer system in which aspects of the present invention may be realized.

In view of FIG. 1, FIG. 2, following, is an exemplary block diagram showing a hardware structure of a data storage system 200 according to one embodiment of the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one example, a data storage system 200 may be implemented as IBM® System Storage™ DS8000™. A network connection 260 may be a Fibre Channel (FC) fabric, a Fibre Channel point to point link, a Fibre Channel over Ethernet (FCoE) fabric or point to point link, a Fibre Connection (FICON) or Enterprise Systems Connection (ESCON) Input/Output (I/O) interface, any other I/O interface type, a wireless network, a wired network, a Local Area Network (LAN), a Widide Area Network (WAN), heterogeneous, homogeneous, public (i.e. the Internet), private, or any combination thereof. The hosts, 210, 220, and 225 may be local or distributed among one or more locations and may be equipped with any type of fabric or network adapter 260 to the storage controller 240, such as Fibre Channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 as depicted in FIG. 2 includes storage controllers 240 and cluster hosts 210, 220, and 225 as shown. The cluster hosts 210, 220, and 225 may include cluster nodes as one of ordinary skill in the art will appreciate.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 2) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the data storage system 200 as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a back reference data structure module 255, comparison module 257, lookup module 259 and decision module 263. The back reference data structure module 255, comparison module 257, lookup module 259 and decision module 263 may work in conjunction with each and every component of the storage controller 240, the hosts 210, 220, 225, and storage devices 230. The back reference data structure module 255, comparison module 257, lookup module 259 and decision module 263 may be structurally one complete module or may be associated and/or included with other individual modules. The back reference data structure module 255, comparison module 257, lookup module 259 and decision module 263 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation module) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the back reference data structure module 255, comparison module 257, lookup module 259 and decision module 263, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a Fibre Channel) 260 as an interface i.e., via at least one switch called "fabric."

The various modules configured to accomplish certain features of the present invention, such as the back reference data structure module 255, comparison module 257, lookup module 259 and decision module 263 may vary according to a particular implementation. As will be further described, each of the back reference data structure module 255, comparison module 257, lookup module 259 and decision module 263 may accomplish specialized tasks according to various embodiments. For example, the back reference data structure module 255 may initialize, configure to a certain form type, convert to a differing form type, and delete certain back reference data structures as will be further described. The back reference data structure module may also configure and/or edit a data segment identification (ID), also as will be described.

Similarly, comparison module 257 may examine information contained in the back reference data structure with information contained in other sources, such as a data segment ID or storage block metadata, or a combination thereof. Lookup module 259 may lookup a particular value, a particular back reference data structure, a particular form type, a particular storage block, a particular portion of storage metadata, or a combination thereof. In addition, based on the specialized activities of the back reference data structure module 255, comparison module 257, or lookup module 259, the decision module 263 may perform various decision-making tasks, such as determining whether to convert a particular form type to a differing form type, or deleting a particular back reference data structure, or deleting a particular storage block and/or storage block metadata. Here again, the specialized functionality of these modules 255, 257, 259, and 263 will become more apparent to one of ordinary skill in the art throughout the following description.

Figure 3:
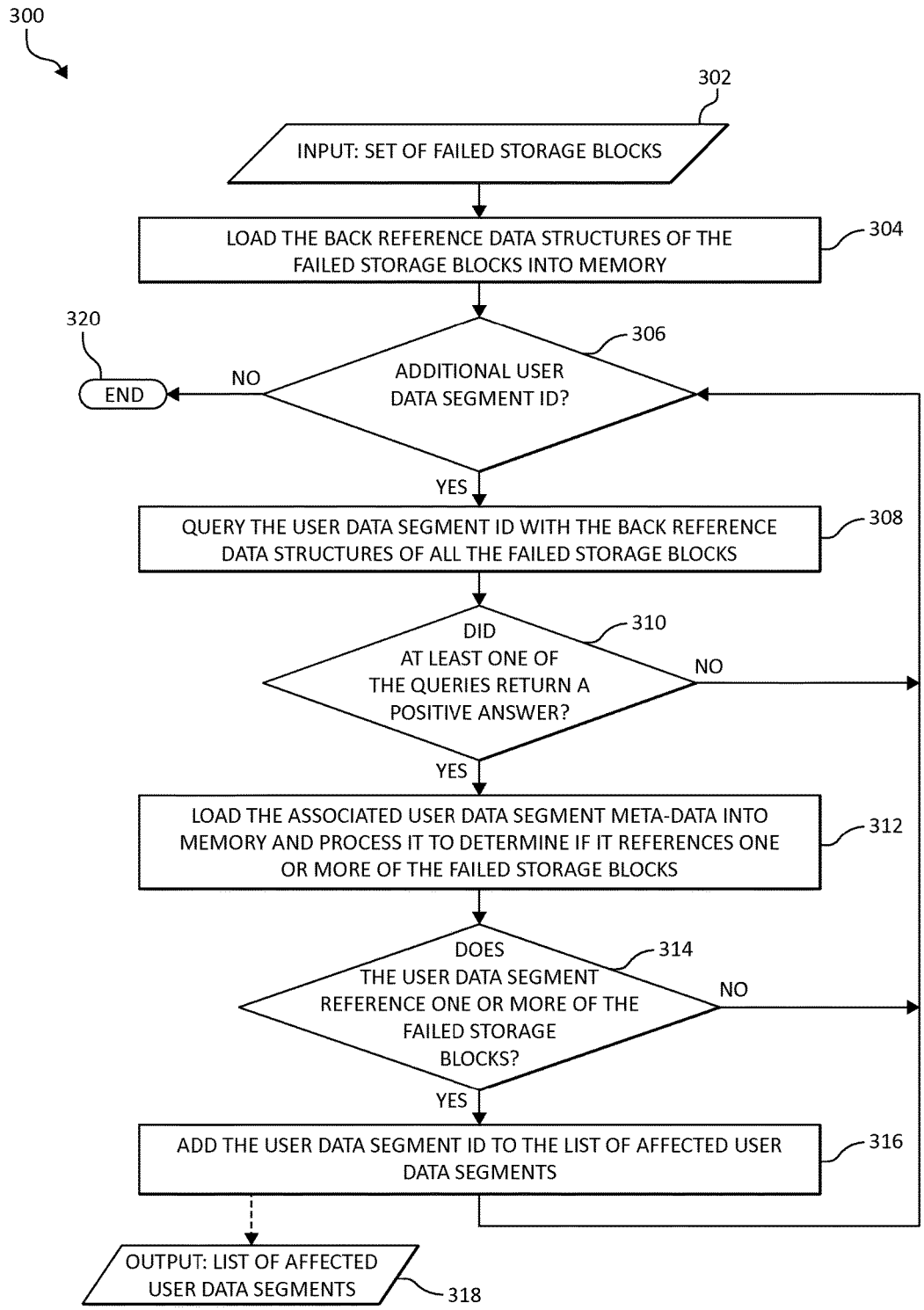
FIG. 3 is a flowchart diagram illustrating an exemplary method for lookup-based determination of affected data segments in storage environments featuring data deduplication functionality, in which aspects of the present invention may be realized.

Referring now to FIG. 3, a flow chart diagram illustrating an exemplary method 300 for determining various affected user data segments given a set of failed storage blocks according to various aspects of the present invention, is shown. A set of storage blocks has failed (shown by inputs 302). As a first step, the back reference data structures of the failed storage blocks is loaded into memory (step 304), and the icentifiers of the user data segments are scanned and queried using the back reference data structures that are loaded in memory. Assume, for example, that the size of a user data segment ID is 4 B (bytes), and a typical size of a user data segment is 1 GB. Accordingly the size of the IDs for 1 TB of user data is 4 KB, which is a relatively small size to read and process.

If, for a given user data segment ID, all the queries associated with the ID returned a negative result, then the associated user data segment is not shown to be referencing any of the failed storage blocks. As shown in FIG. 3, in decision step 306, if an additional user data segment ID is to be analyzed, the user data segment is queried, and the information representative of that ID is compared with the back reference data structured associated with all of the set of failed storage blocks (step 308).

If at least one of the queries does return a positive answer (decision step 310), then the method 300 returns to decision step 306 to a successive/next user data segment ID under analysis. Alternatively, and returning to decision step 310, if for a given user data segment ID at least one of the queries returned a positive answer, then the associated user data segment metadata should be loaded into memory and further processed to determine if it references one or more of the failed storage blocks (step 312). Since most of the storage blocks are referenced by a small portion of the user data segments, most of the user data segment IDs will be pruned by querying the back reference data structures.

Continuing to decision step 314, if a particular user data segment under analysis (selected for further analysis from step 312) references one or more of the filed storage blocks, the method 300 continues to step 316, where the user data segment ID is added to the list of affected user data segments. This list of affected user data segments thereby becomes the output list of affected user data segments (output 318).

Returning to decision step 314, if the particular user data segment selected for further analysis is not determined to reference one or more of the failed storage blocks, the method returns to decision step 306 to a successive/next user data segment ID under analysis. If, in step 306, no other additional user data segment ID's are to be examined, the method 300 ends (step 320).

In one embodiment, the configured size of the back reference data structures is a function of the physical storage blocks that failed and is a small fraction of the physical data it describes. This configured size is in contrast to the size of the user data segments metadata, which is a function of the total nominal user data in a repository. In the various mechanisms of the illustrated embodiments, the metadata that should be processed to determine the affected user data segments given a set of failed storage blocks, is the back reference data structures of the failed storage blocks, the IDs of the user data segments, and the metadata of those user data segments that were determined to potentially reference one or more of the failed storage blocks (this is a small portion of all the user data segments in a repository). Without this solution all the metadata of all the user data segments in a repository has to be processed.

In one embodiment, the back reference data structure of a storage block is built dynamically. As the number of user data segments referencing a storage block is smaller, the back reference data structure is more detailed and enables a better pruning power. This is the common case, as most of the storage blocks have a low number of referencing user data segments.

Assume that each user data segment has a unique identifier (data segment ID) of size 4 bytes. Each storage block is associated with a back reference data structure. In the instant example, the size of the back reference data structure is 16 bytes. However the various embodiments of the present invention are not bounded to this size, as one of ordinary skill in the art will appreciate, and every reasonable and sufficiently small size will be appropriate. For example, if the size of a storage block is 64 KB, then the size ratio of the back reference data structure to the physical data size is 16 B/64 KB=0.000244140625.

Continuing the aforementioned example further, from the 128 bits of the 16 bytes, 2 bits (either most or least significant bits) may be used, in one embodiment, to specify the type of representation of user data segment IDs in the back reference data structure—these are the form type bits as will be further described. The remaining bits, up to 126 bits, may be used to store user data segment IDs or their representation—these are the storage bits. A specific form type value in the form type bits applies to all the storage bits. In one embodiment, as will be described, following, there are four possible types of representation and corresponding forms of the back reference data structure.

In a representative embodiment having four possible form types of the back reference data structure, consider the following exemplary features. (1) Form type value 00 specifies that user data segments IDs of 4 bytes (full data segment IDs) are stored in the storage bits. In this form the 2 bits next to the type bits are used to store the number of IDs stored in the storage bits. Up to 3 IDs can be stored in the storage bits.

(2) Form type value 01 specifies that hashed user data segment IDs of size 2 bytes are stored in the storage bits. The 3 bits next to the type bits are used to store the number of hashed IDs stored in the storage bits. Up to 7 hashed IDs can be stored.

Figure 4:
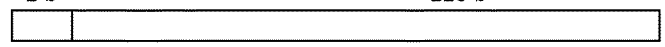
FIG. 4 is a block diagram of exemplary back reference data structures and associated data structure types.
Figure 4:
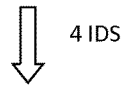
Figure 4:
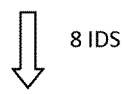
Figure 4:
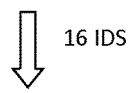

(3) Form type value 10 specifies that hashed user data segments IDs of size 1 byte are stored in the storage bits. The 4 bits next to the type bits are used to store the number of hashed IDs stored in the storage bits. Up to 15 hashed IDs can be stored. Finally, (4) Form type value 11 specifies that the 126 storage bits are a hash table where each bit represents a bucket. FIG. 4, following, illustrates the foregoing specification.

As one of ordinary skill in the art will appreciate, the forgoing specification of four back reference data structure form types is but one exemplary possibility, and other types may be defined in a similar manner.

Accordingly, generalizing the use of form types of various data structures, the first form type specifies that full IDs of user data segments are stored in the back reference data structure—this is the most detailed form. The intermediate form types specify that hashed forms of user data segment IDs are stored, where the number of bits per ID decreases and the level of detail decreases as the form type migrates towards the final form type. And the final form type specifies that the back reference data structure is a hash table where each bit represents a bucket in the space of user data segment IDs, which is the least detailed form. Therefore, when moving from the first form type to the final form type, the number of stored IDs increases and the level of detail (number of bits) per ID decreases.

Turning now to FIG. 4, a block diagram illustration of various back reference structure form types 400 and migration therebetween is presented. As depicted, the back reference data structure of a storage block starts empty (top block illustration, having 2 bits for form type and the remaining 126 bits for storage), and when a user data segment references the storage block, the ID of the user data segment is added to the back reference data structure of the storage block. Progressing from top to bottom, form type 00 of the back reference data structure is used as long as there are up to 3 different user data segments referencing the storage block. When there are 4 different user data segments referencing the storage block, the back reference data structure is migrated to form type 01. When there are 8 different user data segments referencing the storage block, the back reference data structure is migrated to form type 10. When there are 16 different user data segments referencing the storage block, the back reference data structure is migrated to form type 11 (bottom block illustration).

In a typical deduplication storage system, a larger number of storage blocks will be referenced by a few user data segments, and a smaller number of storage blocks will be referenced by a larger number of user data segments. The latter storage blocks contain data patterns that appear more frequently. Therefore, typically the frequency of back reference data structures of a more detailed form is higher. This also applies for a set of failed storage blocks, where the failed blocks occur in random locations. So in a set of failed storage blocks, there will typically be more blocks with a detailed back reference data structure, then blocks with a less detailed back reference data structure, thus increasing the pruning power in the search operation.

Figure 5:
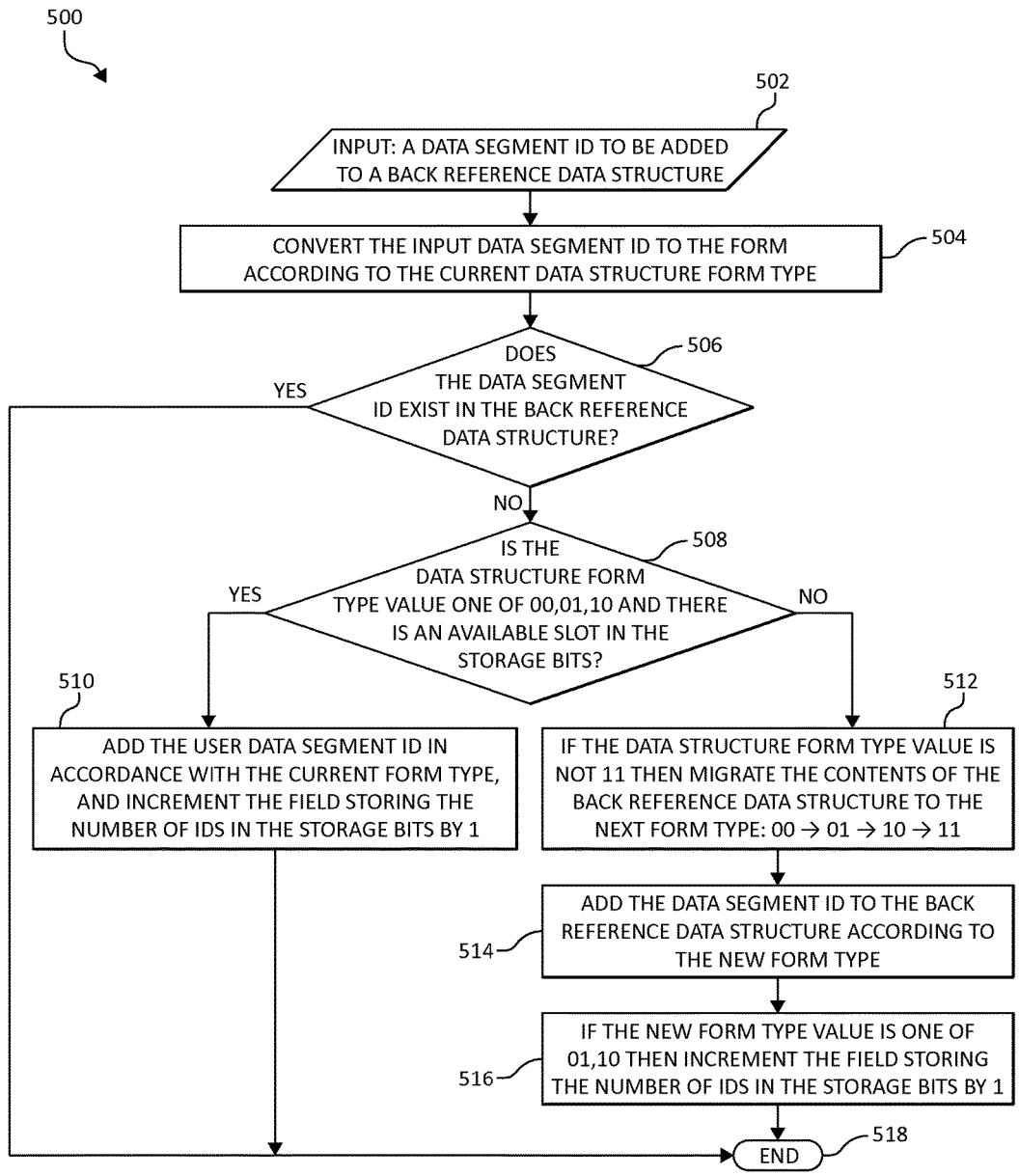
FIG. 5 is a flowchart diagram illustrating an exemplary method for adding a user data segment identification (ID) into a back reference data structure of a storage block.

Turning now to FIG. 5, following, a flow chart diagram illustrates an exemplary mechanism for adding a user data segment ID into the back reference data structure of a storage block shown here as method 500. A data segment ID is shown as an input to be added to a particular back reference data structure (input 502) as method 500 commences.

In a following step 504, the input data segment ID 502 is converted to the form according to the current data structure form type (step 504). If the instant user data segment ID, in its form according to the current data structure form type, already exists in the back reference data structure (decision step 506), the method 500 ends (step 518).

Returning to step 506, If the user data segment ID, in its form according to the current data structure form type, does not exist in the back reference data structure, then the method 500 moves to step 508, which queries whether the applicable data structure form type value one of 00, 01, and 10, and an available slot in the storage bits of the back reference data structure is available (according to the current form type). If so, the user data segment ID is added in accordance with the current form type, and and the field storing the number of IDs in the storage bits is incremented by 1 (step 510).

Returning to step 508, if there is no available slot, then the contents of the back reference data structure is migrated to the next form type, i.e. 00→01→10→11, (step 512), and the data segment ID is added to the back reference data structure according to the new form type (step 514). If the new form type value is one of 01, 10 then the field storing the number of IDs in the storage bits is incremented by 1 (step 516). The method 500 then ends (again, step 518).

In view of the exemplary embodiment of FIG. 5, accordingly, various methods for storing a new user data segment ID in the back reference data structure depending on the current form type or converting between the form types are specified herewith. In a first scenario (1), a new user data segment ID is stored in form type 00. The ID is stored in its original, 4 bytes (full) form. In a second scenario (2), the new user data segment ID is stored in form type 01, or an existing user data segment ID is converted from form type 00 to form type 01. In this case, a hash function is applied to the original 4-byte ID, generating a 2-byte hash value. This 2-byte hash value is the value that is stored.

In a third scenario (3), a user data segment ID is converted from type 01 to form type 10. In this case, a has function is applied to the 2-byte hash values, generating a 1-byte hash value. This 1-byte hash value is the value that is stored.

In a fourth scenario (4), a new user data segment ID is stored in form type 10. In this case, a hash function is applied to the original 4-byte ID, generating a 2-byte hash value; and an additional hash function is applied to the resultant 2-byte hash value to generate a 1-byte hash value. This 1-byte hash value is the value that is stored. Alternatively the two hash functions can be combined into one unified hash function that provides the same combined results, and is applied to the original 4-byte ID, generating a 1-byte hash value to be stored.

In a fifth scenario (5), a user data segment ID is converted from form type 10 to form type 11. In this case, a modulo 126 function (the number of buckets in the hash table) is applied to the 1-by hash value, and the resulting value is the serial number of the bucket whose bit should be set to 1, if not already set to 1.

In a sixth, and final scenario (6), a new user data segment ID is stored in form type 11. A hash function is applied to the original 4-byte ID, generating a 2-byte hash value. An additional hash function is then applied to the 2-byte hash value, generating a 1-byte hash value, and a modulo 126 is applied to the resultant 1-byte hash value, to generate the serial number of the bucket whose bit should be set to 1, if not already set to 1. Alternatively, the hash functions and the modulo operation can be combined into one unified hash function that provides the same combined results, and is applied to the original 4-byte ID, generating the serial number of the bucket whose bit should be set to 1.

Figure 6:
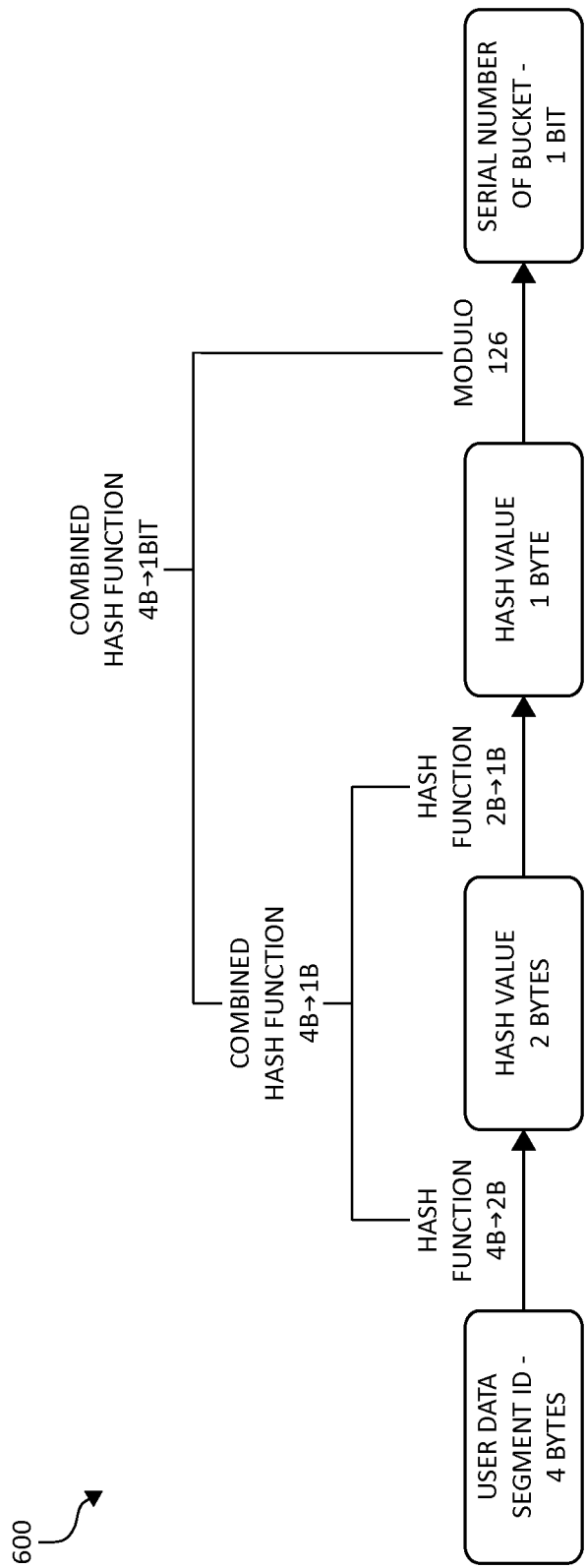
FIG. 6 is a block diagram of an exemplary methodology for storing a new user data segment ID in a back reference data structure depending on a current form type, or conversion between form types.

The exemplary methodology presently described is represented graphically, following, as FIG. 6 in block diagram form. Methodology 600 graphically describes exemplary conversion processes between various form types of user data segment IDs (again, i.e., 00, 01, 10, and 11) as previously detailed. A 4-byte user data segment ID undergoes a hash function to reduce size from 4 bytes to a 2-byte hash value. The 2-byte hash value then may undergo an additional hash function to reduce size from 2 bytes to a 1-byte hash value. Finally, the 1-byte hash value may undergo a modulo 126 function to generate a 1-bit result. Additionally, and as shown, each of the values (4-byte, 2-byte, 1-byte) may alternatively undergo a combined hash function to convert through multiple form types.

Figure 7:
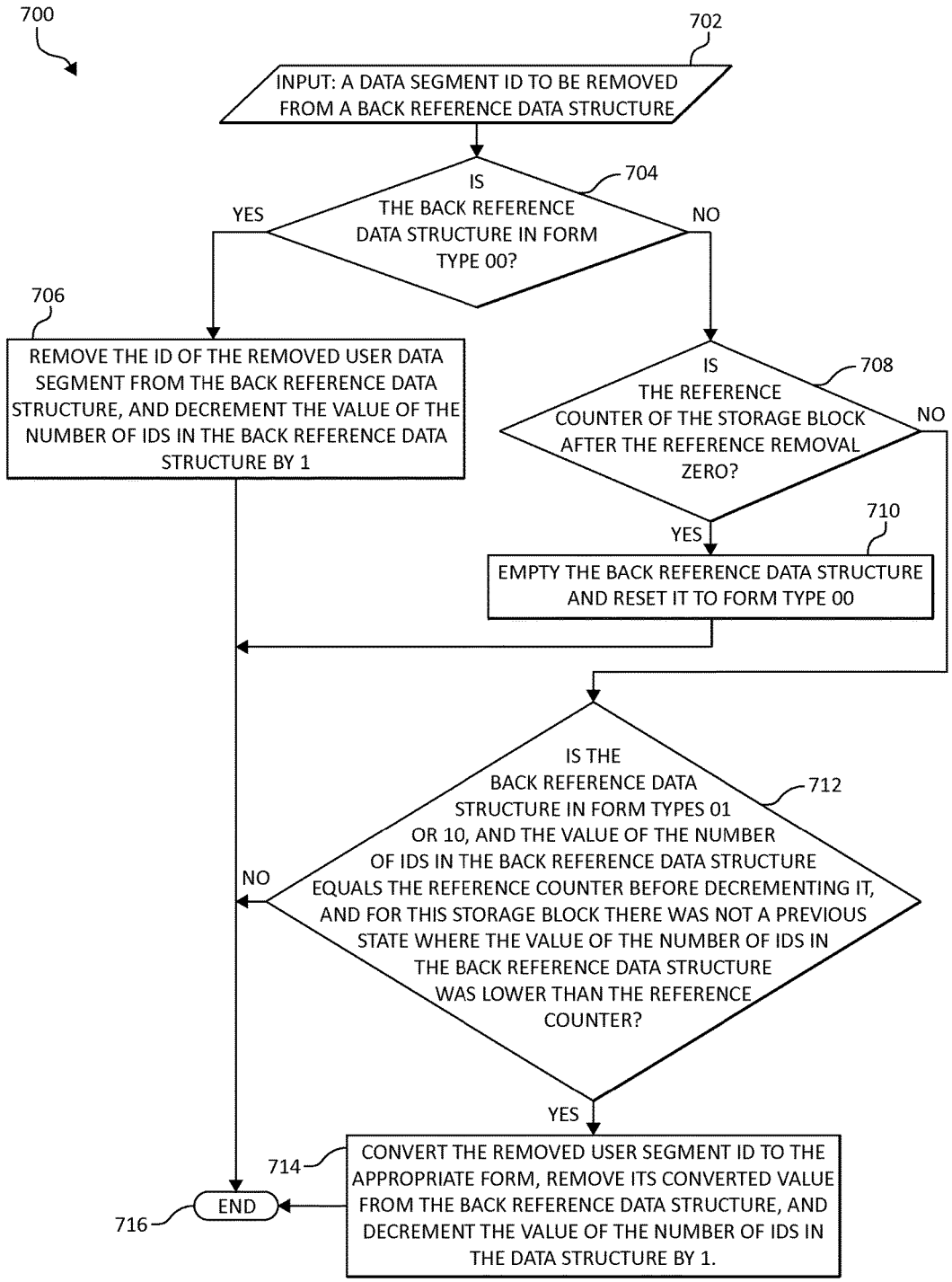
FIG. 7 is a flowchart diagram illustrating an exemplary method for removing a reference to a particular storage block.

Referring now to FIG. 7, following, a flow chart diagram of an exemplary method 700 for removing a reference to a storage block is depicted. In one embodiment, this removal may be triggered when removal of a referencing user data segment.

As input to method 700, a data segment is to be removed from a back reference data structure (input 702). If the back reference data structure is in form type 00 (decision step 704), then the ID of the removed user data segment is removed from the back reference data structure and the value of the number of IDs in the back reference data structure is decremented by 1 (step 706). The method 700 then ends (step 716).

Returning to step 704, if the back reference data structure is in any form type other than 00, the method 700 continues to decision step 708, which queries if the reference counter of the storage block after the reference removal is larger than zero. If no, then the back reference data structure is not modified, and the method 700 continues to decision step 712, below.

Returning to decision step 708, if the reference counter of the storage block after the reference removal is zero, then the back reference data structure is emptied and reset to form type 00 (step 710). The method 700 ends (again, step 716).

Turning to decision step 712, and as an exemplary optimization to the method 700 described, if the back reference data structure is in form types 01 or 10, and the value of the number of IDs in the back reference data structure equals the reference counter before decrementing it, and for this storage block there was not a previous state where the value of the number of IDs in the back reference data structure was lower than the reference counter, then the removed user segment ID is converted (hashed) to the appropriate form, and its converted value is removed from the back reference data structure, also decrementing the value of the number of IDs in the data structure by 1 (step 714). The method 700 then ends (again, step 716).

Consider the following exemplary scenario for querying if a given user data segment ID exists in a given back reference data structure in view of FIG. 7 described previously. The given user data segment ID is converted to a form whose type matches the form type of the back reference data structure. The data segment ID in its converted form is then checked for existence in the back reference data structure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, performed by a processor, for managing data in a data storage having data deduplication, comprising:
   to efficiently recover or reclaim failed data in the data storage, in response to a portion of the data storage determined to be inaccessible:
   querying, by the processor, an identifier of a user data segment by examining a corresponding back reference data structure to determine if the user data segment references a particular storage block, the storage block being associated with both a reference counter and the identifier of the back reference data structure; wherein:
      if the outcome of the query is negative, the user data segment is determined not associated with the particular storage block, and
      if the outcome of the query is positive, the user data segment is warranted be examined further to determine if the user data segment is associated with the particular storage block; wherein further examining the user data segment includes performing:
         inspecting metadata of the back reference data structure associated with the inaccessible portion of the data storage,
         inspecting the identifier of the user data segment in the data storage, and
         inspecting metadata of user data segments whose identifiers returned a positive query outcome for at least one of the back reference data structures associated with the inaccessible portion of the data storage, and wherein the metadata and the identifier of the user data segment is inspected to determine the association with the particular storage block in lieu of scanning all metadata of all user objects in the data storage thereby efficiently identifying the failed data for reclamation.

2. The method of claim 1, further including associating the storage block in the file system with the back reference data structure, the back reference data structure implemented to determine a relationship between the user data segment and the particular storage block in the data storage.

3. The method of claim 1, further including performing one of:
 determining the user data segment as being associated with the particular storage block, and thereby references the particular storage block, and the user data segment, and
 determining the user data segment as being not associated with the particular storage block, and thereby not referencing the particular storage block.

4. The method of claim 1, wherein further examining the user data segment includes inspecting metadata to determine if the particular storage block is referenced by the user data segment.

5. The method of claim 1, further including configuring a size of one or a plurality of back reference data structures to be accommodated in memory.

6. The method of claim 1, further including, pursuant to querying the identifier of a user data segment, loading the back reference data structure into the memory.

7. A system for managing data in a data storage having data deduplication, comprising:
 a processor, operational in the data storage, wherein the processor, to efficiently recover or reclaim failed data in the data storage, in response to a portion of the data storage determined to be inaccessible:
 queries an identifier of a user data segment by examining a corresponding back reference data structure to determine if the user data segment references a particular storage block, the storage block being associated with both a reference counter and the identifier of the back reference data structure; further wherein:
  if the outcome of the query is negative, the user data segment is determined not associated with the particular storage block, and
  if the outcome of the query is positive, the user data segment is warranted be examined further to determine if the user data segment is associated with the particular storage block; wherein further examining the user data segment includes performing:
   inspecting metadata of the back reference data structure associated with the inaccessible portion of the data storage,
   inspecting the identifier of the user data segment in the data storage, and
   inspecting metadata of user data segments whose identifiers returned a positive query outcome for at least one of the back reference data structures associated with the inaccessible portion of the data storage, and wherein the metadata and the identifier of the user data segment is inspected to determine the association with the particular storage block in lieu of scanning all metadata of all user objects in the data storage thereby efficiently identifying the failed data for reclamation.

8. The system of claim 7, further including a data repository, in electrical communication with the processor, for storing the back reference data structure in memory.

9. The system of claim 7, wherein the processor associates the storage block in the file system with the back reference data structure, the back reference data structure implemented to determine a relationship between the user data segment and the particular storage block in the data storage.

10. The system of claim 7, wherein the processor one of:
 determines the user data segment as being associated with the particular storage block, and thereby references the particular storage block, and the user data segment, and
 determines the user data segment as being not associated with the particular storage block, and thereby not referencing the particular storage block.

11. The system of claim 7, wherein the processor, pursuant to further examining the user data segment, inspects metadata to determine if the particular storage block is referenced by the user data segment.

12. The system of claim 7, wherein the processor configures a size of one or a plurality of back reference data structures to be accommodated in memory.

13. The system of claim 7, wherein the processor, pursuant to querying the identifier of a user data segment, loads the back reference data structure into the memory.

14. A computer program product for managing data in a data storage having data deduplication, the computer program product comprising a non-transitory computer-readable storage medium having computer-readable program code portions stored therein, the computer-readable program code portions comprising:
 a first executable portion that, to efficiently recover or reclaim failed data in the data storage, in response to a portion of the data storage determined to be inaccessible:
 queries an identifier of a user data segment by examining a corresponding back reference data structure to determine if the user data segment references a particular storage block, the storage block being associated with both a reference counter and the identifier of the back reference data structure; wherein:
  if the outcome of the query is negative, the user data segment is determined not associated with the particular storage block, and
  if the outcome of the query is positive, the user data segment is warranted be examined further to determine if the user data segment is associated with the particular storage block; wherein further examining the user data segment includes performing:
   inspecting metadata of the back reference data structure associated with the inaccessible portion of the data storage,
   inspecting the identifier of the user data segment in the data storage, and
   inspecting metadata of user data segments whose identifiers returned a positive query outcome for at least one of the back reference data structures associated with the inaccessible portion of the data storage, and wherein the metadata and the identifier of the user data segment is inspected to determine the association with the particular storage block in lieu of scanning all metadata of all user objects in the data storage thereby efficiently identifying the failed data for reclamation.

15. The computer program product of claim 14, further including a second executable portion that associates the storage block in the file system with the back reference data structure, the back reference data structure implemented to determine a relationship between the user data segment and the particular storage block in the data storage.

16. The computer program product of claim 14, further including a second executable portion that one of:
   determines the user data segment as being associated with the particular storage block, and thereby references the particular storage block, and the user data segment, and
   determines the user data segment as being not associated with the particular storage block, and thereby not referencing the particular storage block.

17. The computer program product of claim 14, wherein further including a second executable that, pursuant to examining the user data segment, inspects metadata to determine if the particular storage block is referenced by the user data segment.

18. The computer program product of claim 14, further including a second executable portion that configures a size of one or a plurality of back reference data structure to be accommodated in memory.

19. The computer program product of claim 14, further including a second executable portion that, pursuant to querying the identifier of a user data segment, loads the back reference data structure into the memory.

* * * * *